United States Patent
Savic et al.

(10) Patent No.: US 10,104,171 B1
(45) Date of Patent: Oct. 16, 2018

(54) SERVER ARCHITECTURE HAVING DEDICATED COMPUTE RESOURCES FOR PROCESSING INFRASTRUCTURE-RELATED WORKLOADS

(71) Applicant: EMC Corporation, Hopkinton, MA (US)

(72) Inventors: Dragan Savic, Brookline, MA (US); Michael Robillard, Shrewsbury, MA (US); Adrian Michaud, Carlisle, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 251 days.

(21) Appl. No.: 14/952,140

(22) Filed: Nov. 25, 2015

(51) Int. Cl.
    *G06F 15/173* (2006.01)
    *H04L 29/08* (2006.01)
    *H04L 29/06* (2006.01)
    *H04L 12/911* (2013.01)

(52) U.S. Cl.
    CPC .......... *H04L 67/1036* (2013.01); *H04L 47/70* (2013.01); *H04L 67/148* (2013.01); *H04L 67/42* (2013.01)

(58) Field of Classification Search
    None
    See application file for complete search history.

(56) References Cited

U.S. PATENT DOCUMENTS

| | | |
|---|---|---|
| 2005/0281280 A1 | 12/2005 | Zur et al. |
| 2011/0149116 A1* | 6/2011 | Kim ............. H04N 5/335 348/231.99 |
| 2013/0089089 A1 | 4/2013 | Kamath et al. |
| 2013/0108263 A1 | 5/2013 | Srinivas et al. |
| 2013/0163607 A1 | 6/2013 | Shukla et al. |
| 2013/0318084 A1* | 11/2013 | Dalai ............. G06F 13/16 707/736 |
| 2013/0329743 A1 | 12/2013 | Gai et al. |
| 2014/0059295 A1 | 2/2014 | Northcutt et al. |
| 2014/0115137 A1 | 4/2014 | Keisam |
| 2014/0198686 A1 | 7/2014 | Kamble et al. |
| 2014/0254607 A1 | 9/2014 | Anantharam et al. |
| 2014/0280827 A1 | 9/2014 | Kamble et al. |
| 2014/0280841 A1 | 9/2014 | Kamble et al. |
| 2014/0307556 A1 | 10/2014 | Zhang |
| 2014/0337391 A1 | 11/2014 | Starovoitov et al. |

(Continued)

*Primary Examiner* — Umar Cheema
*Assistant Examiner* — Anthony T Rotolo
(74) *Attorney, Agent, or Firm* — Ryan, Mason & Lewis, LLP

(57) ABSTRACT

Systems, methods, and articles of manufacture comprising processor-readable storage media are provided for implementing server architectures having dedicated systems for processing infrastructure-related workloads. For example, a computing system includes a server node. The server node includes a first processor, a second processor, and a shared memory system. The first processor is configured to execute data computing functions of an application. The second processor is configured to execute input/output (I/O) functions for the application in parallel with the data computing functions of the application executed by the first processor. The shared memory system is configured to enable exchange of messages and data between the first and second processors.

17 Claims, 12 Drawing Sheets

(56) References Cited

U.S. PATENT DOCUMENTS

| | | |
|---|---|---|
| 2014/0365622 A1 | 12/2014 | Iyengar et al. |
| 2014/0379928 A1 | 12/2014 | Song et al. |
| 2015/0067212 A1 | 3/2015 | Talla |
| 2015/0071053 A1 | 3/2015 | Kempf et al. |
| 2015/0092593 A1 | 4/2015 | Kompella |
| 2015/0113038 A1 | 4/2015 | Fedders et al. |
| 2015/0172539 A1* | 6/2015 | Neglur ............... H04N 5/23206 348/207.1 |
| 2016/0132369 A1* | 5/2016 | Lee ....................... G06F 1/3296 713/2 |

* cited by examiner

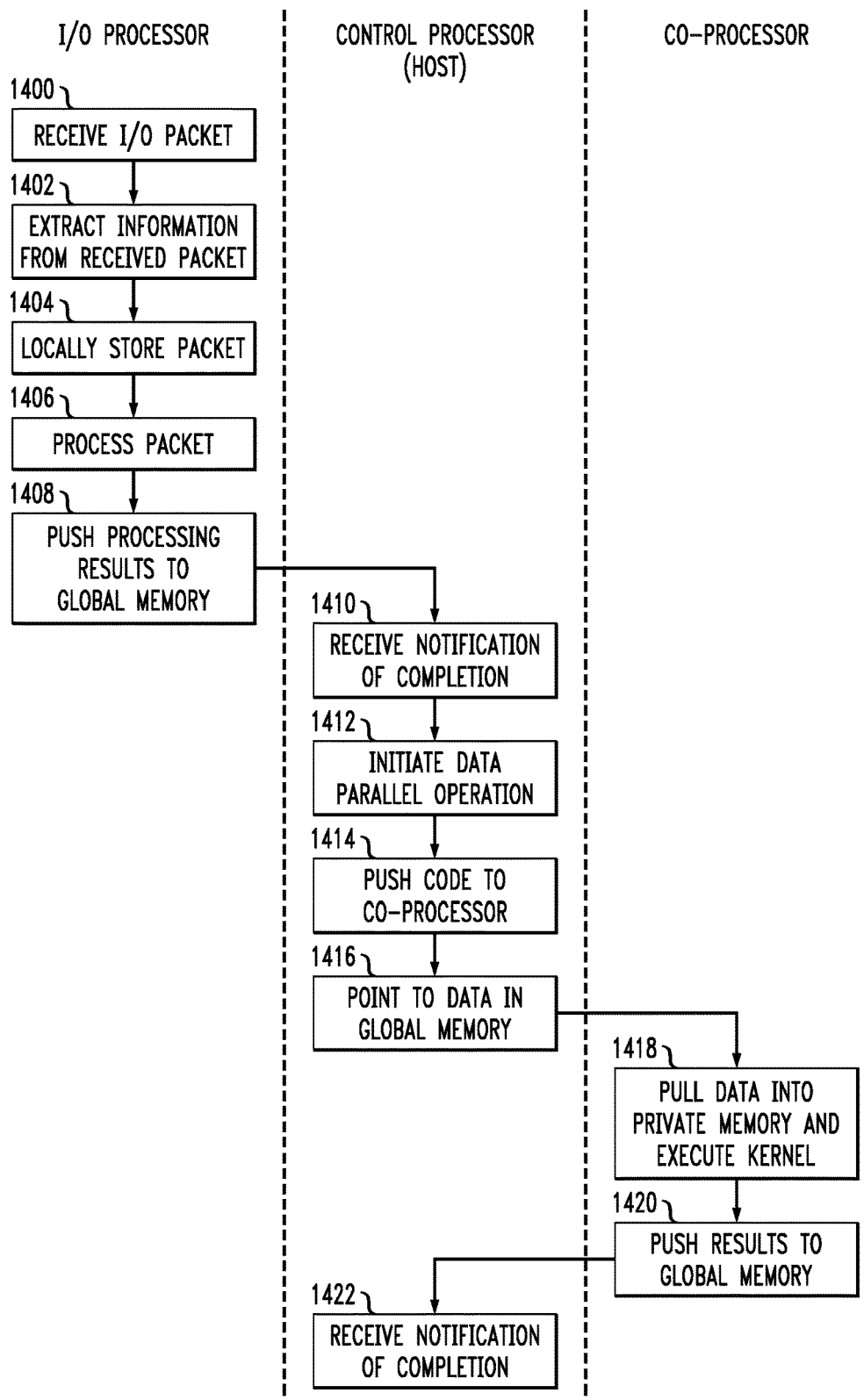

SERVER ARCHITECTURE HAVING DEDICATED COMPUTE RESOURCES FOR PROCESSING INFRASTRUCTURE-RELATED WORKLOADS

FIELD

This disclosure relates generally to computing systems and, in particular, to server architectures for implementing computing systems.

BACKGROUND

Today, conventional server architectures are designed around general purpose processors (GPPs) which serve as a single data processing engine to execute a variety of different functions. These functions include data processing functions, as well as infrastructure-related functions. For example, infrastructure related functions executed by a GPP enable the GPP to serve as an I/O controller and data hub, a server flash (cache) controller, a local storage controller, and a shared MMU (memory management unit). While server architectures implemented using GPPs have served the computing industry successfully, the use of GPPs to implement such a wide range of server functionality is problematic in terms of, e.g., efficiency and excess data movement. Indeed, not all processing tasks are executed efficiently (in terms of power, processor cycles, TCO (total cost of ownership), etc.) on a GPP. For example, the non-optimal execution of tasks on a GPP can result in the consumption of important resources such as internal buses, fabrics, memory bandwidth, processor cycles, cache, etc. With regard to data movement, a GPP must frequently move data and program code in and out of the GPP's external memory (DRAM) to process workloads for receiving and processing I/O data and executing the software stacks that support IO and storage functionality, which can unduly consume a large amount of processor cycles.

SUMMARY

Illustrative embodiments include computing systems having server architectures configured with dedicated systems for processing infrastructure-related workloads. For example, one embodiment of the invention includes a computing system. The computing system includes a server node, wherein the server node includes a first processor, a second processor, and a shared memory system. The first processor is configured to execute data computing functions of an application. The second processor is configured to execute input/output (I/O) functions for the application in parallel with the data computing functions of the application executed by the first processor. The shared memory system is configured to enable the exchange of messages and data between the first and second processors.

Other embodiments of the invention include, without limitation, methods and articles of manufacture comprising processor-readable storage media.

BRIEF DESCRIPTION OF THE DRAWINGS

FIG. 14 illustrates an example data processing flow that is implemented by the server system of FIG. 12 to provide full I/O processing isolation as well as co-processing isolation from a server processor, according to an embodiment of the invention.

DETAILED DESCRIPTION

Figure 1:
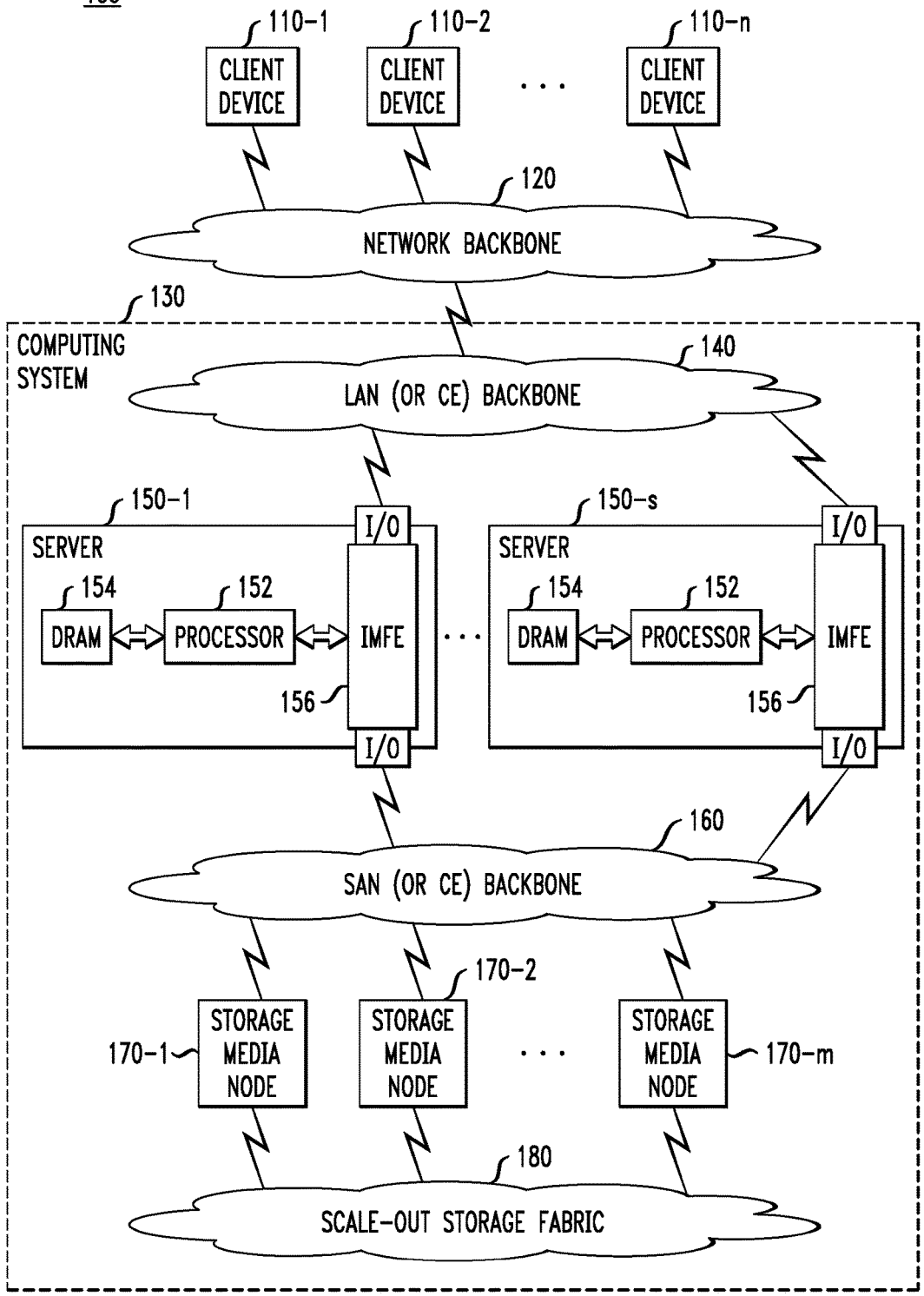
FIG. 1 schematically illustrates a computing system which includes a plurality of servers with dedicated compute resources configured to process infrastructure-related workloads, according to an embodiment of the invention.

Illustrative embodiments will now be described in further detail with regard to server architectures having dedicated systems for processing infrastructure-related workloads, and software techniques for implementing such server architectures. It is to be noted that the same or similar reference numbers are used throughout the drawings to denote the same or similar features, elements, or structures, and thus, a detailed explanation of the same or similar features, elements, or structures will not be repeated for each of the drawings.

It is to be understood that the term "computing system" as used herein is intended to be broadly construed so as to encompass, for example, any system comprising multiple networked processing devices such as a data center or any private or public cloud computing system or enterprise network. Moreover, the term "data storage system" as used herein is intended to be broadly construed so as to encompass, for example, any type of data storage system, or combination of data storage systems, including, but not limited to storage area network (SAN) systems, network attached storage (NAS) systems, Hadoop Distributed File System (HDFS), as well as other types of data storage systems comprising clustered or distributed virtual and/or physical infrastructure.

The term "processor" (or "compute element") as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators (e.g., protocol termination, cryptographic, compression, deduplication, RAID, etc.). Examples of workload-optimized processors include, for example, graphics processing units (GPUs), digital signal processors (DSPs), system-on-chip (SoC), application-specific integrated circuits (ASICs), and field programmable gate array (FPGAs), and other types of specialized processors or coprocessors that are configured to execute one or more fixed functions. By way of further example, a processor (or compute element) may be a GPGPU (general purpose computing on graphics processing unit) processor device. The term "hardware accelerator" broadly refers to any hardware that performs "hardware acceleration" to perform certain functions faster and more efficient, than is possible for executing such functions in software running on a more general purpose processor.

Furthermore, the term "control plane" as used herein refers to a set of control functions that are executed to control the flow of data through a data storage system, for example, the "signaling" of the system. Moreover, the term "data plane" as used herein (also referred to as the "forwarding plane") refers to a processing path that data takes as the data flows through the data storage system (e.g., a sequence of data processing functions performed on data that is received from a network entity and stored in a data storage system, or a sequence of data processing functions performed on data that is accessed from the data storage system and transmitted to some network entity requesting the data).

In addition, the term "infrastructure-related workloads" as used herein broadly refers to server workloads associated with receiving and processing I/O data, controlling data storage functions, and interfacing with communications networks.

FIG. 1 schematically illustrates a computing system which is implemented with servers having dedicated systems for processing infrastructure-related workloads, according to an embodiment of the invention. In particular, FIG. 1 schematically illustrates a computing network 100 comprising a plurality of client devices 110-1, 110-2, . . . , 110-n (collectively referred to as client devices 110), a network 120, and a computing system 130. The computing system 130 comprises a LAN (local area network) 140 (or CE (Converged Ethernet) network), a plurality of server nodes 150-1, . . . , 150-s (collectively referred to as servers 150), a SAN (storage area network) 160 (or CE network), a plurality of storage media nodes 170-1, 170-2, . . . , 170-m (collectively referred to as storage media nodes 170), and a scale-out storage fabric 180. In one embodiment, the SAN 160 and the scale-out storage fabric 180 can be separate fabrics with separate switches. In another embodiment, the SAN 160 and the scale-out storage fabric 180 can be implemented as a single fabric using a CE framework. In this regard, it is to be understood that the network architecture of the FIG. 1 is merely an example framework, and that other network architectures can be utilized to implement a networked-based storage and communications network.

As further shown in FIG. 1, each server node 150-1, . . . , 150-s comprises at least one processor 152 (e.g., general purpose processor), volatile memory 154 (e.g., DRAM), and at least one dedicated system 156 for processing infrastructure-related workloads, which dedicated system is referred to herein as an "IMFE (Intelligent Memory Fabric element)." As explained in further detail below, the IMFE 156 of a given server node 150-1, . . . , 150-s comprises one or more workload-optimized processors that are configured to process workloads associated with, e.g., receiving and processing I/O data and/or controlling data storage functions. In other words, the IMFE 156 of a given server node 150-1, . . . , 150-s is configured to offload such I/O and storage related functions from the processor 152, and allow the processor 152 to utilize its resources for, e.g., data processing and VM (virtual machine) support.

The client devices 110 may comprise, for example, desktop computers, laptop computers, PDAs (personal digital assistants), smart phones, electronic tablets, or other types of computing devices that enable users and other entities to access the computing system 130 via the network 120. The network 120 may comprise, for example, a global computer network such as the Internet, a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the network 120 in some embodiments therefore comprises combinations of multiple different types of communications networks each comprising network devices configured to communicate using Internet Protocol (IP) or other related communication protocols. The network 120 comprises intermediate points (such as routers, switches, etc.) and other elements that form a network backbone to establish communication paths and enable communication between network endpoints.

In one embodiment, the computing system 130 performs data processing and storage functions to support one or more network applications and/or on-line services that are associated with private or public entities. In particular, the servers 150 of the computing system 130 comprise front-end application servers and/or web servers, which are configured to host and manage one or more applications, which are used by multiple, simultaneously connected users and/or entities. Depending on the implementation of the computing system 130, the servers 150 are configured to, e.g., execute business logic, execute scripts and services to query databases, and perform other computing functions that are needed to host and deliver network applications and services to multiple end users, service providers, and/or organizations. In one embodiment of the invention, the computing system 130 is implemented using a cluster of servers which reside in a single facility (e.g., data center facility of a private company) or a cluster of servers which reside in two or more data center facilities or which are distributed over remote locations (e.g., distributed over a cloud network) of a given service provider, for example.

The LAN 140 is configured as a front-end customer facing network that enables client access to the servers 150. In one embodiment, the LAN 140 backbone comprises a plurality of network switches with Ethernet ports, wherein the network switches utilize a Converged Ethernet (CE) networking protocol to implement a CE-based LAN 140. The SAN 160 is configured as a storage network that enables communication between the servers 150 and the storage media nodes 170. In one embodiment, the SAN 160 backbone comprises a plurality of network switches (e.g., FC (Fiber Channel)-based network switches) which utilize a communications protocol (e.g., Fiber Channel) to implement a storage area network, or some other suitable storage network.

Each of the servers 150 interfaces with the LAN 140 and SAN 160 (or CE) using an associated IMFE 156. The IMFE 156 comprises one or more workload optimized processors that are configured to execute various network interface functions to enable network communications over the LAN 140 and SAN 160. For example, the IMFE 156 implements network interface functions to handle I/O traffic between the servers 150 and the LAN 140, wherein such network interface functions comprise functions that are the same or similar to those network interface functions typically implemented by a network adaptor such as an Ethernet NIC (Network Interface Card). In addition, the IMFE 156 implements network interface functions to handle I/O traffic between the servers 150 and the SAN 160, wherein such network interface functions comprise functions that are the same or similar to those network interface functions typically implemented by a HBA (Host Bus Adapter) card (e.g., a Fiber Channel HBA card) to communicate with the SAN 160.

The storage media nodes 170 include persistent storage elements to store data, as well as control circuitry that is configured to control data access operations for storing or accessing data to and from one or more persistent storage elements that are associated with the storage media nodes 170. The persistent storage elements can be implemented using one or more different types of persistent storage devices such as HDDs (hard disk drives), flash storage devices, disk storage devices, SSD (solid state drive) devices, or other types and combinations of non-volatile memory. The storage media nodes 170 are configured as a networked-based storage to provide a centralized repository for data that can be stored and accessed by the servers 150. The storage media nodes 170 collectively provide a pool of storage resources which can be utilized by the servers 150.

The storage media nodes 170 implement HBA cards to communicate with the servers 150 over the SAN 160 (or CE). In addition, the storage media nodes 170 implement fabric cards that are configured to enable peer-to-peer communication between the storage media nodes 170 via the scale-out storage fabric 180 which comprises an internal fabric backplane having fabric switches that are separate from the network switches of the SAN 160 (or the same fabric switches as in a CE implementation).

In another embodiment, the computing system 130 may be comprised of a plurality of virtual machines (VMs) that are implemented using a hypervisor, and which execute on one or more of the servers 150, for example. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is one element of what is more generally referred to as "virtualization infrastructure." The hypervisor runs on physical infrastructure, e.g., CPUs and/or storage devices. An example of a commercially available server virtualization platform that may be used to implement portions of the computing system 130 in one or more embodiments of the invention is the VMware® vSphere™ which may have an associated virtual infrastructure management system such as the VMware® vCenter™. The underlying physical infrastructure may include one or more distributed processing platforms that include storage products such as VNX® and Symmetrix VMAX®, both commercially available from EMC Corporation (Hopkinton, Mass.).

Figure 2:
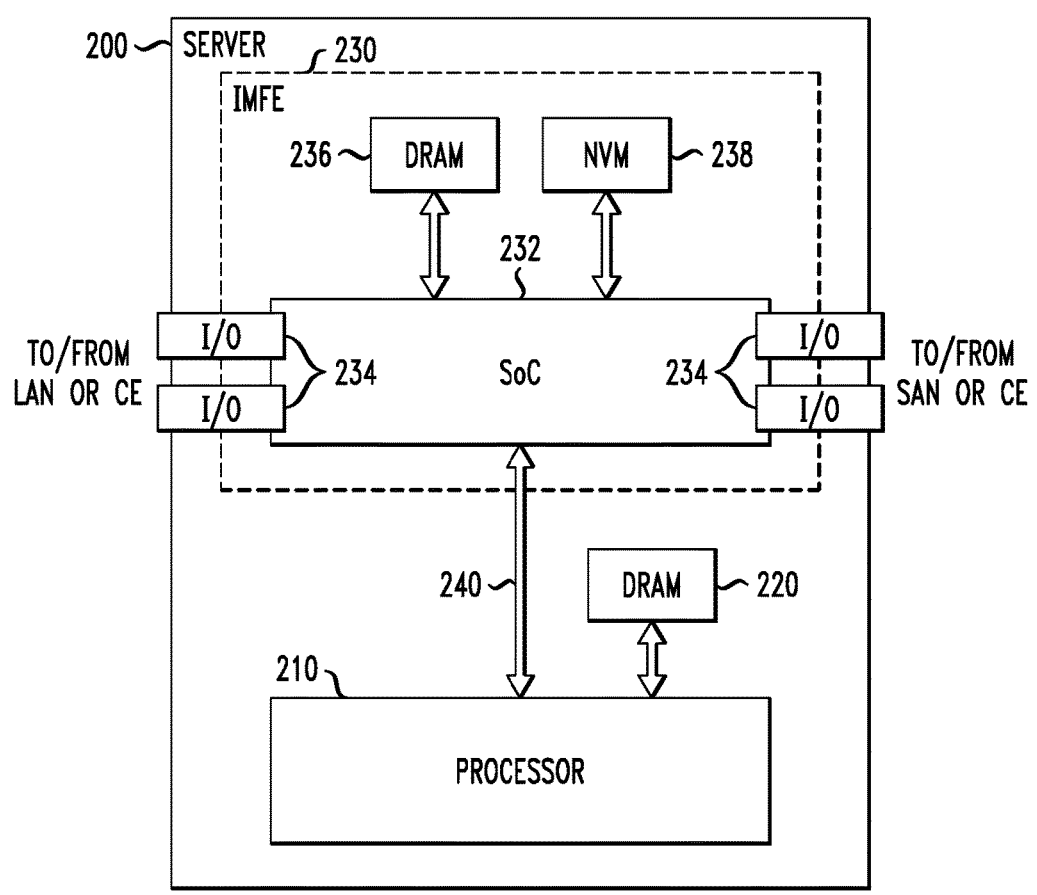
FIG. 2 schematically illustrates a server architecture according to an embodiment of the invention.

FIG. 2 schematically illustrates a server architecture having a dedicated system for processing infrastructure related workloads, according to an embodiment of the invention. In particular, FIG. 2 illustrates a server 200 comprising a server processor 210, volatile memory 220 (e.g., DRAM) coupled to the server processor 210, and an IMFE 230. The IMFE 230 comprises a SoC 232 with integrated I/O ports 234, as well as volatile memory 236 (e.g., DRAM) and non-volatile memory (NVM) 238 (e.g., NAND flash memory) coupled to the SoC 232. In one embodiment of the invention, the server processor 210 is a general purpose processor that is implemented using a XEON® brand microprocessor, for example, although other types of general purpose or workload optimized hardware processors may be implemented.

The SoC 232 of the IMFE 230 comprises an integrated circuit comprising one or more workload-optimized processors that are configured to process workloads associated with, e.g., receiving and processing I/O data and/or controlling data storage functions. The IMFE 230 is configured to offload such I/O and storage related functions from the server processor 210, and allow the server processor 210 to utilize its resources solely for, e.g., data processing and VM (virtual machine) support.

A conventional server architecture typically comprises a GPP, and separate NIC and HBA adaptors coupled to the GPP to communicate with a front-end customer facing network and backend storage networks. In addition, various types of memory elements are coupled to the GPP including non-volatile memory (e.g., array of DRAM elements) and one or more levels of non-volatile memory (e.g., array of SSD and Flash NAND elements). In the conventional server architecture, the GPP is configured to handle various infrastructure-related workloads such as processing I/O data and executing software to support I/O and storage functionality. For example, the GPP controls storage and movement of I/O between the volatile memory and the NIC and HBA cards. In addition, the GPP controls caching and movement of data between the volatile and non-volatile memories. Further, the GPP accesses program code from the volatile memory which the GPP executes to perform various infrastructure-related functions. All of these functions impart processing burden on the GPP of a conventional server.

In accordance with embodiments of the invention, the IMFE 230 essentially combines server-side storage elements, and I/O and storage functionalities into an intelligent memory fabric, which comprises a combination of volatile and non-volatile memory elements, fabric interfaces, workload-optimized processors, fixed function accelerators, storage elements, and I/O functionalities. More specifically, the IMFE 230 comprises a group of storage elements (e.g., DRAM 236 and NVM 238) and controls such storage elements using storage workload-optimized compute elements on the SoC 232, which could also be configured to perform some types of local data processing. In addition, the IMFE 230 combines the functions I/O compute elements and controls I/O processing using I/O workload-optimized processors that pre-process incoming data (thereby reducing memory size and processing power required from the GPP).

In one embodiment, the IMFE 230 implements a high bandwidth, multi-port shared memory system, wherein the I/O and storage data flows are offloaded from the internal bus/fabrics of the GPP directly to the IMFE 230 memory system. In this manner, the IMFE 230 minimizes latency by removing the host server memory system from the fast data path of the GPP. The IMFE 230 comprises one or more processor cores and accelerators to essentially create "intelligent memory fabric".

The IMFE 230 is configured to function as a front-end infrastructure-optimized system, which offloads various I/O and storage functions from the server processor 210. For example, the IMFE 230 is configured to perform various I/O functions such as I/O data stream initiation and termination, data hashing, data cryptography, data compression deduplication, data integrity checking, and other local data processing or data plane functions which are commonly implemented in data storage processing systems. In addition, the IMFE 230 is configured to execute data storage functions on behalf of the server node, wherein the data storage functions include data placement, data replication, erasure coding, server caching, memory indexing and memory lookup functions. The IMFE 230 can also offload other infrastructure functionality such as virtual switching from hypervisors running on the server processor 210. Moreover, the SoC 232 of the IMFE 230 comprises converged network adapter functions to provide a data entry point and data exit point to and from a front-end communications network and a back-end data storage network (e.g., LAN 140 and SAN 160, FIG. 1). Essentially, the IMFE 230 provides a bypass path for data flows that are offloaded from the server processor 210 and processed more efficiently by workload-optimized processor elements of the SoC 232, rather than the server processor 210 (e.g., GPP).

The server processor 210 (e.g. CPU/GPP) communicates with the IMFE 230 via an interface 240. In one embodiment, the interface 240 is configured as memory load/store-type interface (which is byte-addressable heterogeneous space and fabric-connected). In particular, in one embodiment of the invention, interface 240 is implemented using a high speed SERDES (Serializer/Deserializer)-type interface (e.g. HMC-like, QPI, UPI, PCIe, RapidIO, etc.). In another embodiment, the interface 240 is implemented using a DDRx (double data rate memory) interface technology that can support split transactions. In another embodiment, the server processor 210 and IMFE 230 could communicate through other buses/links, but with data exchange being implemented using a shared, common multiport memory. In alternative embodiments of the invention, communication between multiple processors can be implemented using a shared memory alone, or using a shared memory together with other communication busses/interfaces to enable efficient message passing between multiple processors or compute elements. Depending on the processor architectures and the communication protocols implemented, communication between processors can be implemented using a coherent or non-coherent protocol via a dual port memory or shared memory, and using coherent or non-coherent busses/interfaces.

In the embodiment of FIG. 2, the internal resources of the server processor 210 are utilized for data processing tasks (e.g., data computing functions of an application), wherein other I/O, storage, and networking tasks are offloaded to and handled by the IMFE 230. For example, the I/O and storage tasks are offloaded from the server processor 210 to the IMFE 239 such that the resources of the server processor 210 are only utilized for VM support and data processing. These tasks are typically monetizable and more efficiently executed by speed cores.

The server architecture of FIG. 2 provides various advantages. For compute intensive applications, the conventional server technology is CPU/Memory bound due to high computational requirements, so offloading IO and storage related traffic to the IMFE 230 provides a significant advantage. For these applications, the IMFE 230 could also act as an offloading engine for indexing, fast lookups (using network searching engines like look-aside interface based TCAMs), or any other offload, thus providing additional benefit. For non-compute intensive applications (e.g. when moving large volumes of data), conventional server technology is I/O bound and the CPU may be underutilized. In this instance, offloading I/O, storage and certain application-related processing to the IMFE 230 would provide a significant advantage.

Figure 3:
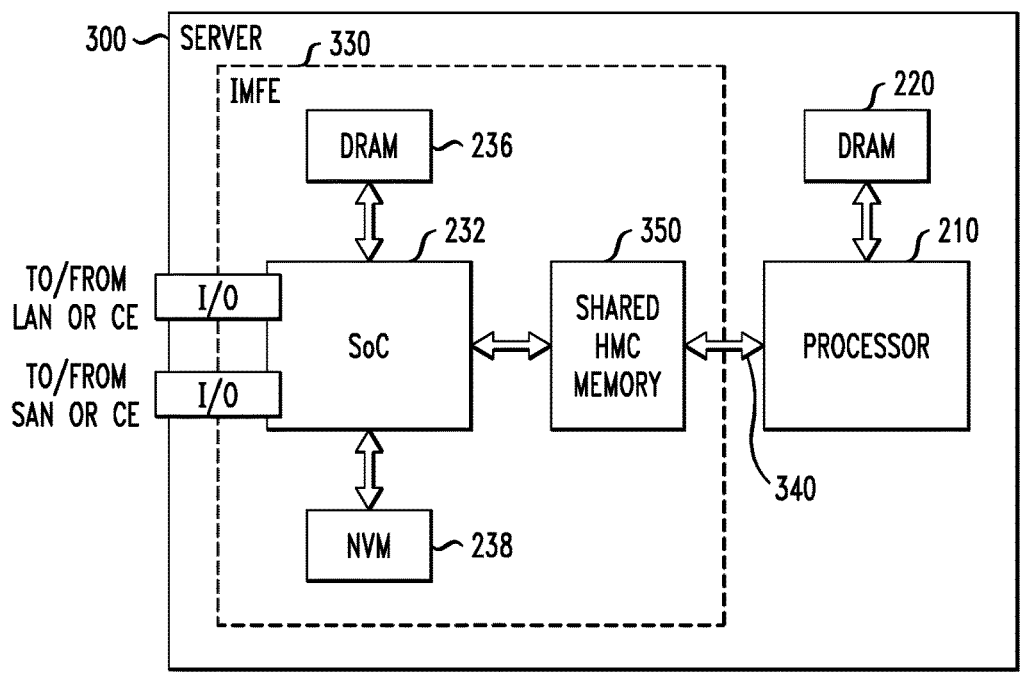
FIG. 3 schematically illustrates a server architecture according to another embodiment of the invention.

FIG. 3 schematically illustrates a server architecture according to another embodiment of the invention. In particular, FIG. 3 illustrates a server 300 which is similar to the server 200 of FIG. 3, but wherein an IMFE 330 of the server 300 implements an HMC (Hybrid Memory Cube) interface 340 and shared HMC memory 350 to enable communication between the server processor 210 and the SoC 232 of the IMFE 330. In the embodiment of FIG. 3, the shared HMC memory 350 is accessible by the server processor 210 and the SoC 232. In one embodiment of the invention, a shared memory system (e.g., interface 340 and shared HMC memory 350) can be implemented to provide a non-coherent shared memory interface, which allows compute intensive applications to communicate with their I/O counterparts using IMFE messages that are passed between the IMFE 330 and the server processor 210.

Figure 4:
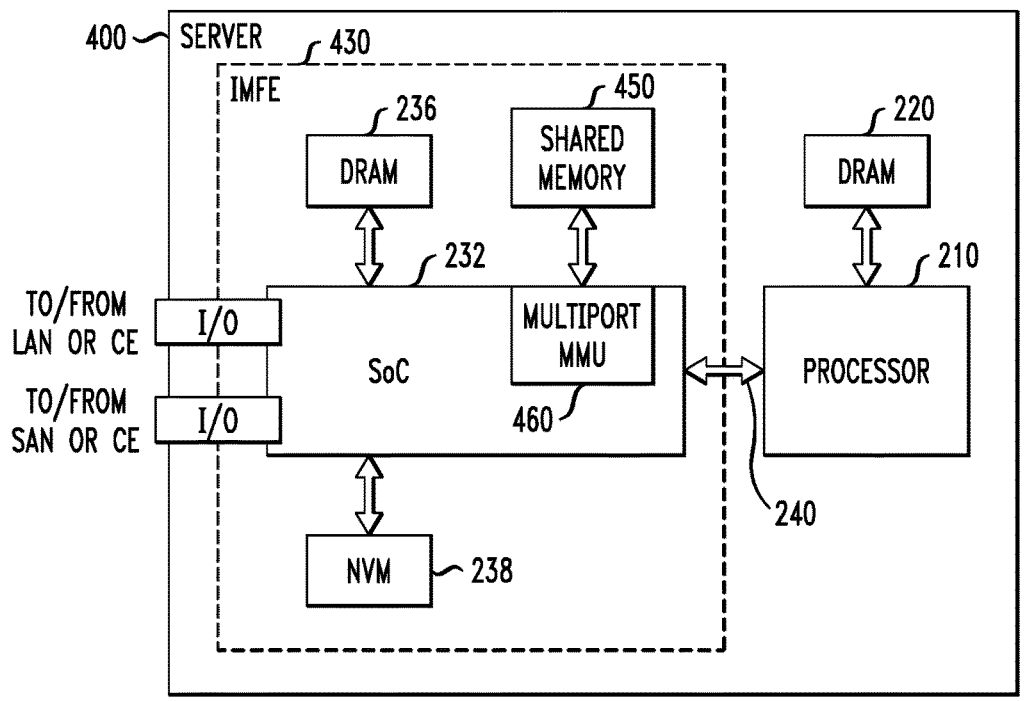
FIG. 4 schematically illustrates a server architecture according to another embodiment of the invention.

FIG. 4 schematically illustrates a server architecture according to another embodiment of the invention. In particular, FIG. 4 illustrates a server 400 comprising an IMFE 430, wherein IMFE 430 comprises a shared memory 450 which is connected to the SoC 232. In this embodiment, the SoC 232 comprises an integrated multiport MMU (memory management unit) 460 which is utilized by the SoC 232 and the server processor 210 to access and manage the shared memory 450 and, thereby, communicate via the shared memory 450. The shared memory 450 may be used alone, or used together with other communication busses/interfaces to enable efficient message passing between the server processor(s) and processors of the SoC 232. As noted above, depending on the processor architectures and the communication protocols implemented, communication between the server processor(s) and processors of the SoC 232 can be implemented using a coherent or non-coherent protocol via a dual port memory or shared memory, and using coherent or non-coherent busses/interfaces.

Figure 5:
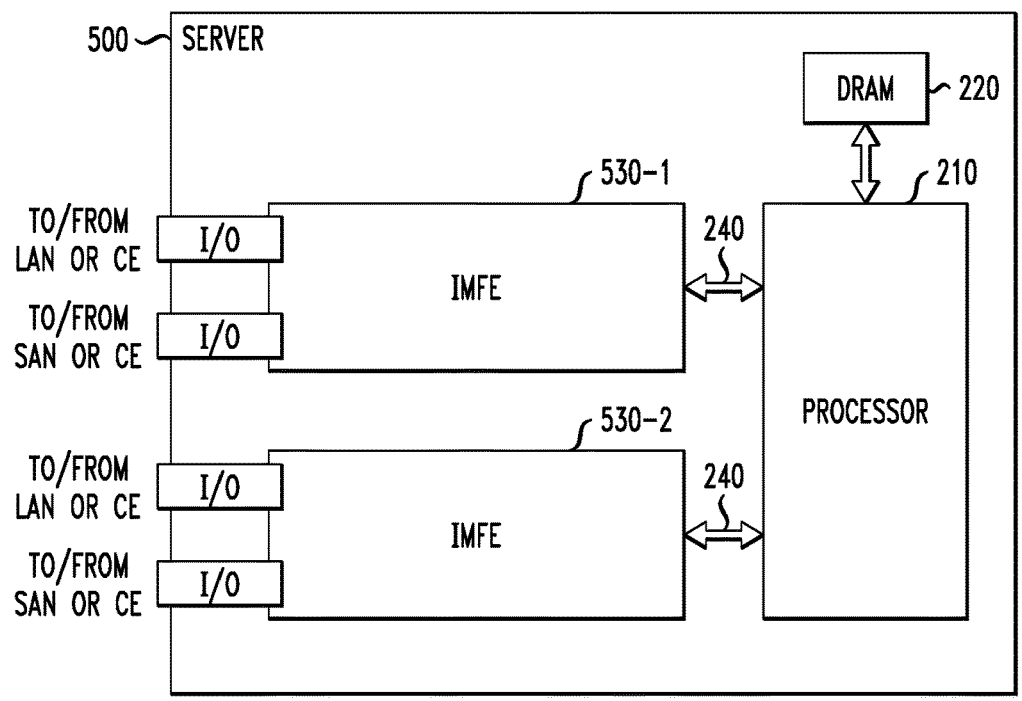
FIG. 5 schematically illustrates a server architecture according to another embodiment of the invention.

FIG. 5 schematically illustrates a server architecture according to another embodiment of the invention. In particular, FIG. 5 illustrates a server 500 comprising a plurality of IMFEs (e.g., IMFE 530-1 and IMFE 530-2) coupled to the server processor 210 using suitable interfaces 240. The IMFEs 530-1 and 530-2 can be implemented using any of the IMFE architectures discussed herein. The embodiment of FIG. 5 provides an efficient solution where the server 500 is I/O bound and multiple IMFE elements are used to feed data into the server processor 210 to optimize utilization of the server processor 210.

Figure 6:
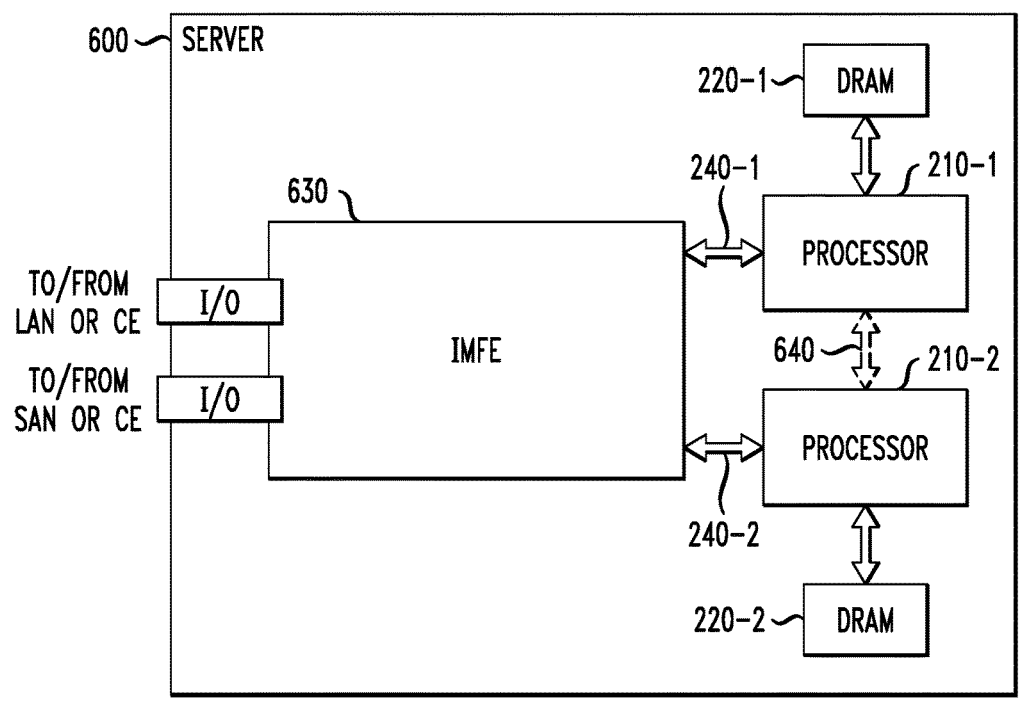
FIG. 6 schematically illustrates a server architecture according to another embodiment of the invention.

FIG. 6 schematically illustrates a server architecture according to another embodiment of the invention. In particular, FIG. 6 illustrates a server 600 comprising a plurality of server processors 210-1 and 210-2 and associated volatile memories 220-1 and 220-2, and an IMFE 630 that is coupled to both server processors 210-1 and 210-2 via respective interfaces 240-1 and 240-2. An optional interface 640 (e.g., UPI (Universal Peripheral Interface) can be implemented to enable direct communication between the server processors 210-1 and 210-2. The embodiment of FIG. 6 provides an efficient solution where the server 600 executes compute intense loads, and the single IMFE 630 provides support to both server processors 210-1 and 210-2 to optimize utilization of the server processors 210-1 and 201-2. In one embodiment, both server processors 210-1 and 210-2 may be GPPs. In another embodiment, one of the server processors 210-1 or 210-2 may be a GPGPU, FPGA, another SoC, ASIC, etc.

Figure 7:
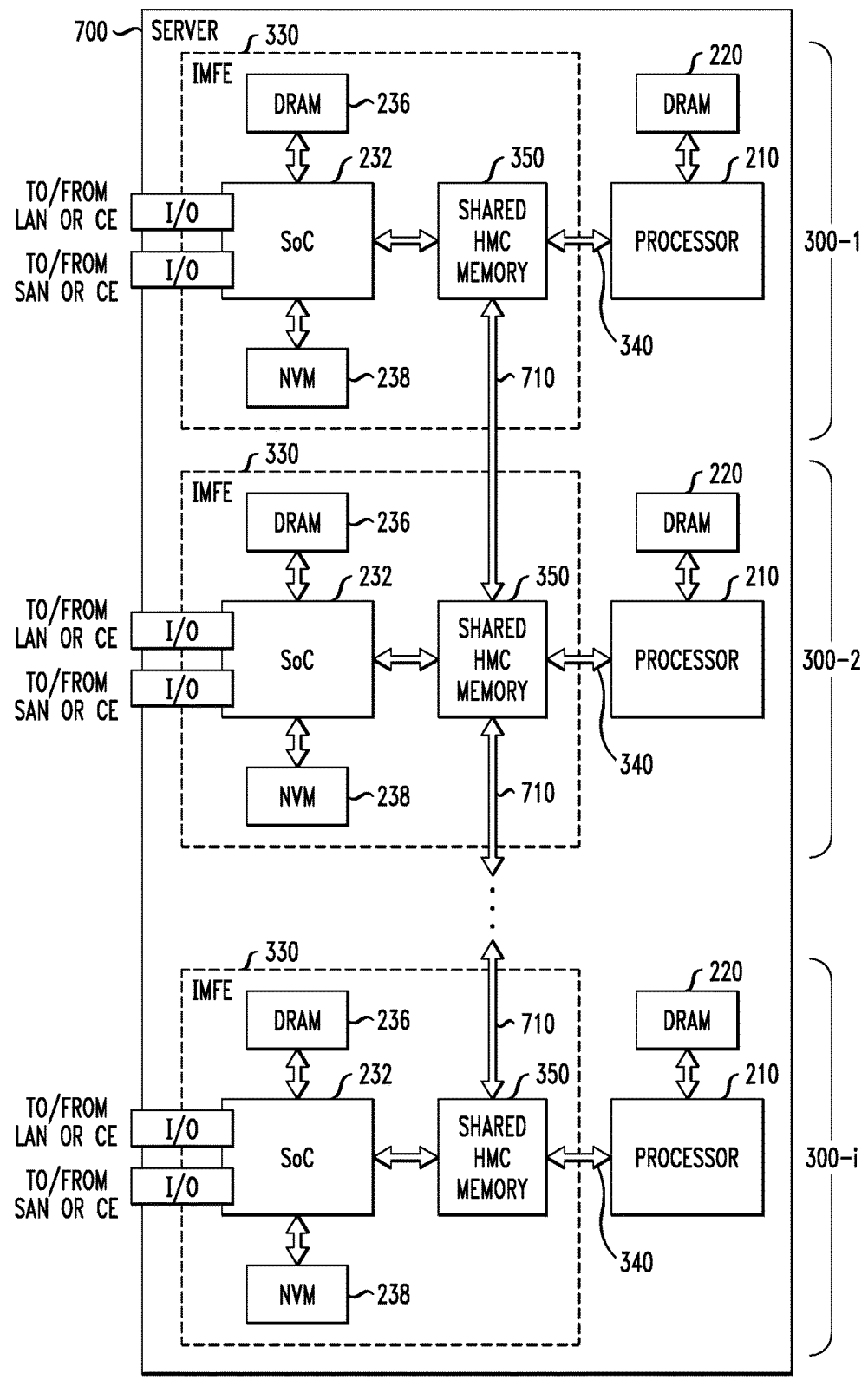
FIG. 7 schematically illustrates a server architecture according to another embodiment of the invention.

FIG. 7 schematically illustrates a server architecture according to another embodiment of the invention. In particular, FIG. 7 illustrates a server 700 comprising a plurality of interconnected server nodes 300-1, 300-2, . . . , 300-i, each having a server framework as discussed above with reference to FIG. 3. In the embodiment of FIG. 7, a communications fabric 710 (e.g., HMC fabric) is implemented to interconnect the shared HMC memories 350 of the server nodes 300-1, 300-2, . . . , 300-i. With this embodiment, an HMC packet-based fabric 710 is utilized to connect cubes of the shared HMC memories 350 of the IMFEs 330 to form networked pools of memory which are shared among the server nodes 300-1, 300-2, . . . , 300-i.

Figure 8:
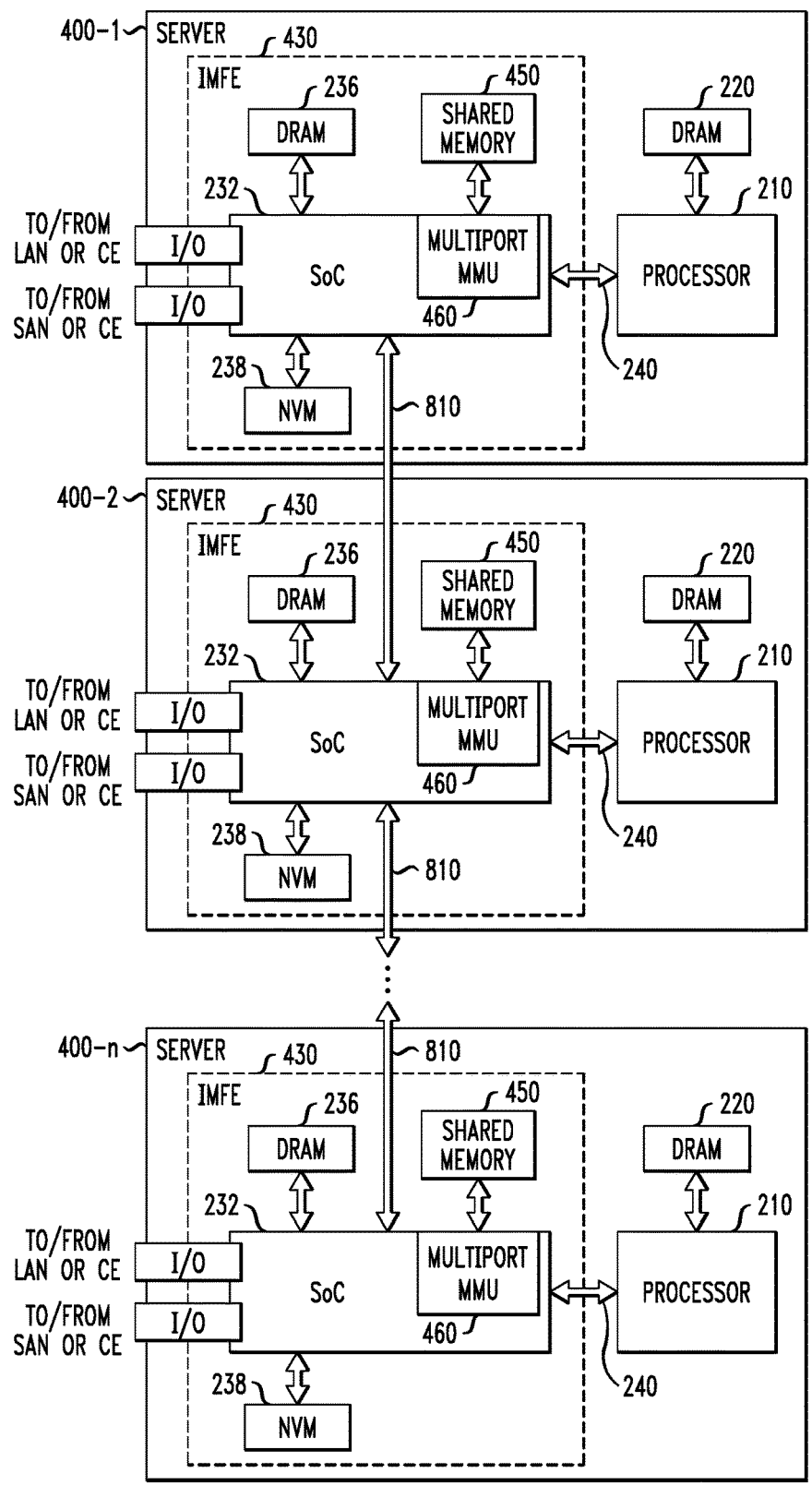
FIG. 8 schematically illustrates a plurality of servers which are interconnected using a fabric protocol, according to an embodiment of the invention.

FIG. 8 schematically illustrates a server architecture according to another embodiment of the invention. In particular, FIG. 8 illustrates a server system 800 comprising a plurality of interconnected server nodes 400-1, 400-2, . . . , 400-n, each having a server framework as discussed above with reference to FIG. 4. In the embodiment of FIG. 8, a communications fabric 810 (e.g., Serial RapidIO) is implemented to interconnect the IMFE SoCs 232 of the server nodes 400-1, 400-2, . . . , 400-n. This embodiment provides an implementation of scaling IMFE-based servers using the communications fabric 810 to connect multiple servers.

Figure 9:
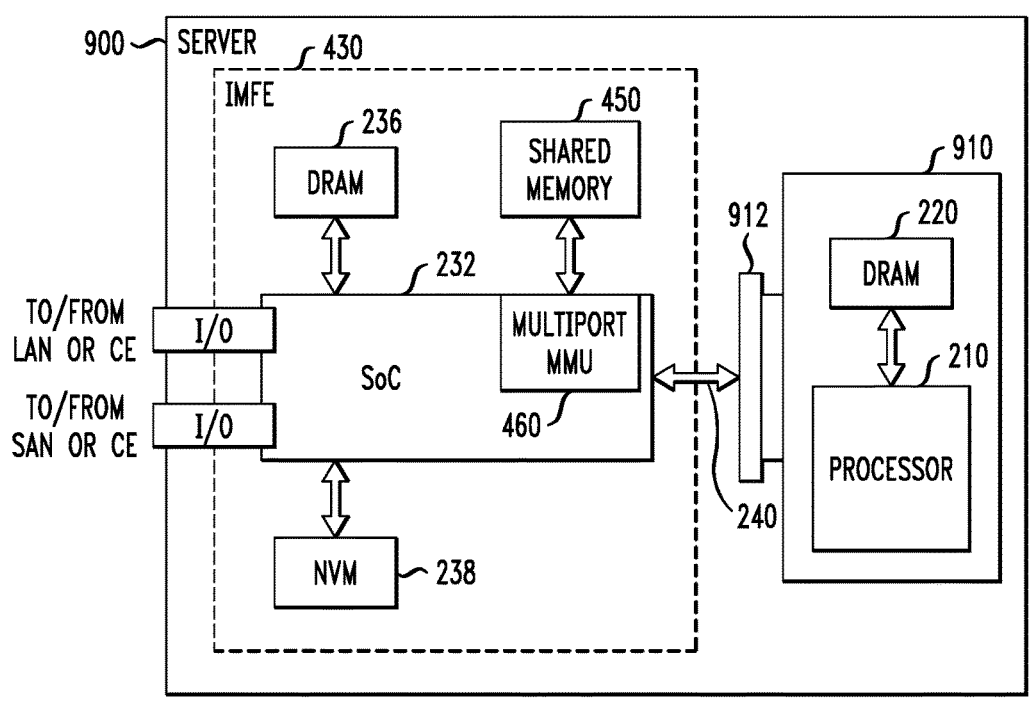
FIG. 9 schematically illustrates a server architecture according to another embodiment of the invention.

FIG. 9 schematically illustrates a server architecture according to another embodiment of the invention. In particular, FIG. 9 illustrates a server 900 having a server architecture which is similar to the server architecture discussed above with reference to FIG. 4, except that the server processor 210 and local DRAM 220 are optionally added as a back-end accelerator 910 (which is coupled to the IMFE 430 via a suitable connector 912) to address GPP optimized loads. In other words, in the embodiment of FIG. 9, the server processor 210 of the back end connected accelerator 910 provides optional processing power to the IMFE 430 to execute GPP-optimized workloads.

In accordance with various embodiments of the invention, the IMFE-based server architectures discussed herein are implemented using various software architectures that allow applications running on a server to be split and isolated into several components wherein the components of the application that perform compute intensive data processing functions are executed by the server processors (e.g., GPP), and wherein the components of the application that perform, as an example, I/O data processing and network interface functions are executed on the SoC of a dedicated IMFE system. Such I/O and network relate functions include, for example, transferring data over a network directly from storage files, handling network congestion, handling I/O traffic, etc. This is in contrast to conventional server and software frameworks in which an application executes on a server GPP and utilizes the GPP to process and handle all incoming and outgoing data through an I/O sub-system. In addition, all network traffic is handled by network protocol layers of a host operating system, which consume GPP compute resources. All storage activity such as encryption, compression, decompression, deduplication, read-ahead, and caching is handled by a block I/O scheduler and drivers of the host operating system, which also consume GPP compute resources.

Figure 10:
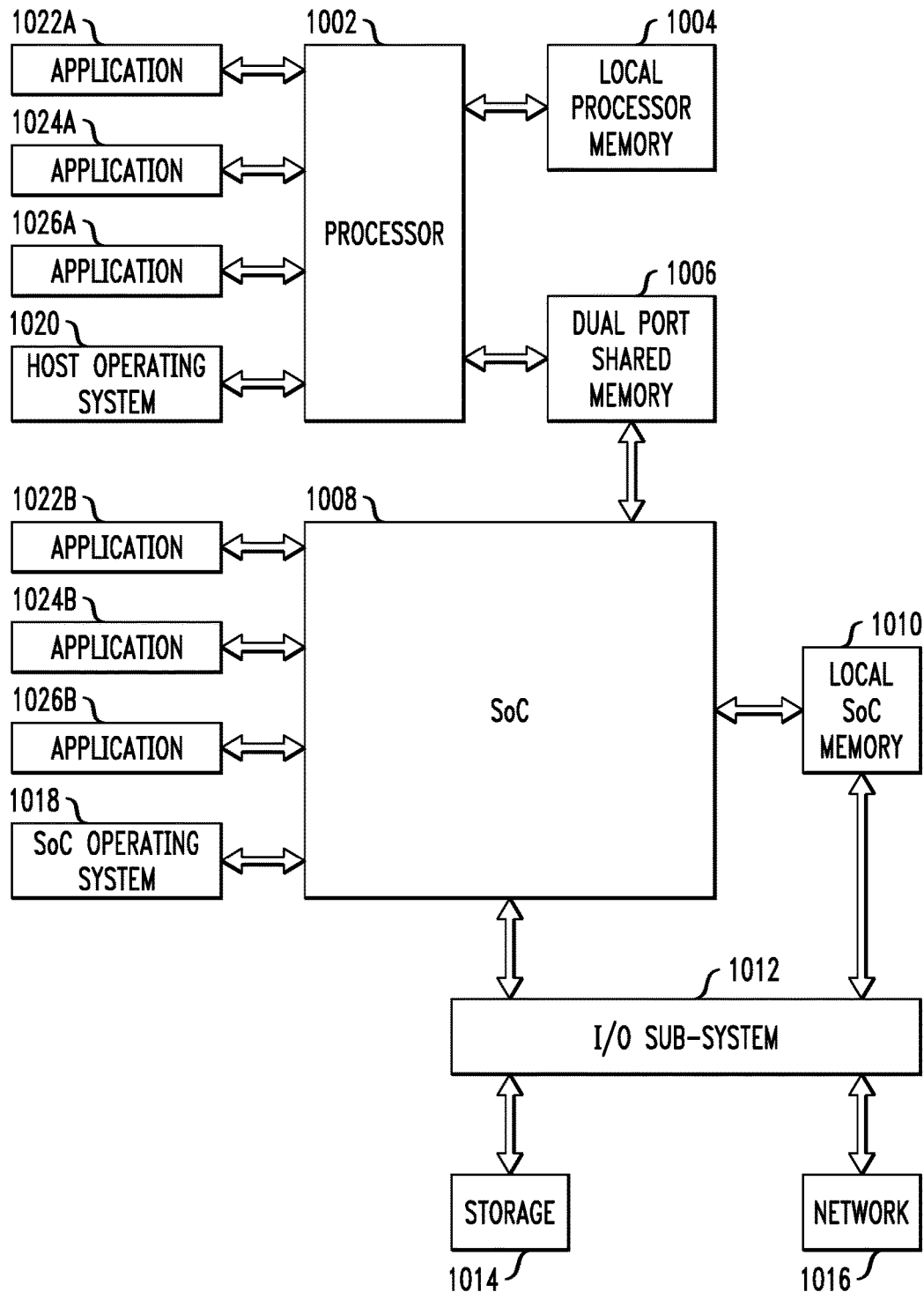
FIG. 10 schematically illustrates a software architecture which is utilized by a server to offload application I/O data processing from a server processor to a system-on-chip that is dedicated for processing I/O and other infrastructure related workloads, according to an embodiment of the invention.

FIGS. 10, 11, 12, 13, and 14 illustrate different software architectures that can be implemented to split, isolate, and offload I/O processing and network related functions (and other infrastructure related workloads) to IMFE system resources that are dedicated to handling I/O processing and network interface functions. For example, FIG. 10 schematically illustrates a software architecture which is utilized by a server to offload application I/O data processing to a dedicated system resources for processing I/O and other infrastructure related workloads, according to an embodiment of the invention. More specifically, FIG. 10 illustrates a computing system 1000 comprising a server processor 1002, local processor memory 1004, a dual port shared memory 1006, a SoC 1008, local SoC memory 1010, and an I/O sub-system 1012. The I/O sub-system 1012 is coupled to local non-volatile data storage 1014, and a communications network 1016.

As further shown in FIG. 10, a SoC operating system 1018 runs on the SoC 1008, and a host operating system 1020 runs on the server processor 1002. The computing system 1000 runs a plurality of applications including a first application 1022 (comprising components 1022A and 1022B), a second application 1024 (comprising components 1024A and 1024B), and a third application 1026 (comprising components 1026A and 1026B). The components 1022A, 1024A, and 1026A of the respective applications 1022, 1024, 1026 execute on the server processor 1002 and utilize the host operating system 1020, while the components 1022B, 1024B, and 1026B of the respective applications 1022, 1024, and 1026 execute on the SoC 1008 and utilize the SoC operating system 1018.

The software framework depicted in FIG. 10 provides complete I/O processing isolation from the server processor 1002, wherein the application components 1022A, 1024A, and 1026A of the respective applications 1022, 1024, 1026 focus on compute intensive tasks without being burdened by I/O activity and processing, and wherein the application components 1022B, 1024B, and 1026B of the respective applications 1022, 1024, 1026 focus on I/O and network processing related functions. For example, for a web server application, the compute intensive components of such application would be components that dynamically generate HTML (Hyper Text Markup Language) pages, or components that execute some type of interpreted language such as PHP (Hypertext Preprocessor) or some other scripting language that is used for development of web services, for example. On the other hand, the I/O and network processing components of a web server application would be those components that are configured to connect clients, process credentials, transfer data files, transfer cache data that does not need to be dynamically generated, etc.

The compute intensive application components 1022A, 1024A, and 1026A of the respective applications 1022, 1024, 1026 communicate with their I/O counterpart components 1022B, 1024B, and 1026B using the dual port shared memory 1006 and an associated shared memory interface. In one embodiment of the invention, as discussed in further detail below with reference to FIG. 11, the dual port shared memory 1006 is configured to enable a messaging protocol to pass messages between the compute components 1022A, 1024A, and 1026A executing on the server processor 1002 and the corresponding I/O application components 1022B, 1024B, and 1026B executing on the SoC 1008. As noted above, depending on the processor architectures and the communication protocols implemented, communication between the server processor 1002 and the processor(s) of the SoC 1008 can be implemented using a coherent or non-coherent protocol via a dual port memory or shared memory, and using coherent or non-coherent busses/interfaces.

In one embodiment, the host operating system 1020 (which runs on the server processor 1002) is a full blown OS such as Linux. In an alternate embodiment, the host operating system 1020 is a stripped down OS which does not include device drivers, network protocol stacks, file systems, or storage stacks, for example. Instead, the host operating system 1020 is configured as an optimized "compute only" based operating system which primarily focuses on memory and process management and does not have to deal with typical I/O interrupts, interrupt latency, or other typical I/O sub-system issues. All system calls (with the exception of process, memory, and IPC (inter process communication) system calls) are removed from the kernel and replaced with non-system call user-land equivalents that pass messages from the compute components 1022A, 1024A, and 1026A executing on the server processor 1002 to the corresponding I/O application components 1022B, 1024B, and 1026B executing on the SoC 1008 via a shared memory window instead of invoking an expensive system call/context switch.

Furthermore, in one embodiment of the invention, the SoC operating system 1018 (which runs on the SoC 1008 of an IMFE) is a full blown OS such as Linux. In an alternate embodiment, the SoC operating system 1018 is a stripped down OS with only device drivers, network protocol stacks, file systems, storage stacks, and other kernel services. In one embodiment, the SoC operating system 1018 serves as a system-call gateway that is used by applications running on the server processor's host operating system 1020 to request I/O and network processing services. For example, the SoC operating system 1018 is configured to handle network protocol stack processing, and to provide storage services such as encryption, compression, decompression, deduplication, read-ahead, and caching. The application components 1022B, 1024B, and 1026B executing on the SoC 1008 can perform additional processing of application data before the data is either sent back out via the I/O sub-system or passed onto the corresponding application components 1022A, 1024A, and 1026A executing on the server processor 1002.

The embodiment of FIG. 10 illustrates a "split application load" embodiment in which the applications 1022, 1024 and 1026 are split into respective components 1022A/1022B, 1024A/1024B, and 1026A/1026B, wherein the split application components A/B can execute in parallel on the server processor 1002 and the SoC 1008, respectively, and allow data compute processing and I/O processing to be performed in parallel. In other embodiments of the invention, an application that is primarily "compute only" does not necessarily need a dedicated B component and, similarly, an application that does not require a significant amount of general processing does not necessarily need a dedicated A component.

The local processor memory 1004 and the local SoC memory 1010 can be implemented using various types of electronic memory such as random access memory (RAM), read-only memory (ROM), or other types of memory, in any combination. The local processor memory 1004 stores program instructions associated with the application components 1022A, 1024A, 1026A, and the host operating system 1020, for example, which program instructions are read and processed by the server processor 1002 to run the host operating system 1020 and application components 1022A, 1024A, 1026A on the computing system 1000 (e.g., server). Similarly, the local SoC memory 1010 stores program instructions associated with the application components 1022B, 1024B, 1026B, and the SoC operating system 1018, for example, which program instructions are read and processed by the SoC 1008 to run the SoC operating system 1018 and the application components 1022B, 1024B, 1026B on the computing system 1000.

The local processor memory 1004 and the local SoC memory 1010 and other persistent storage elements described herein having program code tangibly embodied thereon are examples of what is more generally referred to herein as "processor-readable storage media" that store executable program code of one or more software programs. Other examples of processor-readable storage media embodying program code include, for example, optical or magnetic storage disks. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

Figure 11:
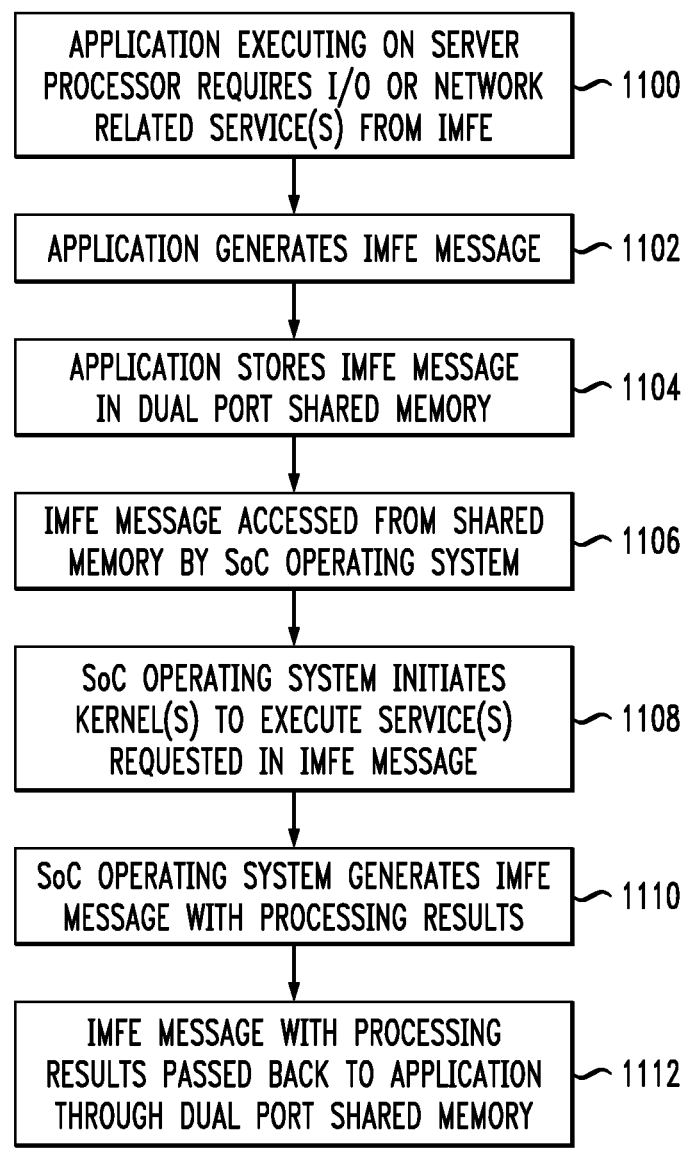
FIG. 11 illustrates a method that is implemented in a server to provide a memory-based system call interface between a server processor and a system-on-chip which is dedicated for processing infrastructure related workloads, according to an embodiment of the invention.

FIG. 11 illustrates a method that is implemented in a server to provide a memory-based system call interface between a server processor and a system-on-chip which is dedicated for processing infrastructure related workloads, according to an embodiment of the invention. For purposes of illustration, the method of FIG. 11 will be discussed in context with the embodiment of FIG. 10. While an application is executing on the server processor 1002, the application may need I/O and/or network related services from an IMFE of the server (block 1100). The application will generate an IMFE message requesting such services (block 1102). The application will store the IMFE message in the dual port shared memory 1006 using an associated memory interface protocol (block 1104). The SoC operating system 1018 executing on the SoC 1008 will access the IMFE message from the dual port shared memory 1006 (block 1106). The SoC operating system 1018 will then initiate one or more kernels to execute the services requested in the IMFE message (block 1108). The SoC operating system 1018 (and/or associated application B component) will then incorporate the processing results in a response IMFE message (block 1110). The IMFE message with the processing results is then passed back to the requesting application through the dual port shared memory 1006 (block 1112).

The embodiments shown in FIGS. 10 and 11 provide a memory based system call interface between the server processor and an IMFE (e.g., SoC 1008 and I/O sub-system 1012) via the dual port shared memory 1006. The application running on the server processor 1002 sends I/O requests directly to the IMFE which handles the I/O requests, and the application receives processing results from the IMFE. In one embodiment, a select set of system calls related to I/O processing are redirected to the IMFE directly instead of being handled locally by the host operating system 1020. This is in contrast to conventional operating systems in which the host OS provides a system call interface that allow applications to issue a system call to request I/O services from the operating system (among many other services), which causes a context switch into a kernel which performs one or more I/O tasks, and then provides the results back to the requesting application.

In the embodiments of FIGS. 10 and 11, for example, the application can perform compute operations on the server processor 1002 in parallel with the requested I/O services being executed by the SoC operating system 1018 on the SoC 1008 of the IMFE. This provides a system-call like barrier between the server processor 1002 and the SoC 1008 while maintaining some compatibility with existing software. The split application components running on the server processor 1002 and SoC 1008 can also provide their own customized messages for communicating between the server processor and IMFE components.

Figure 12:
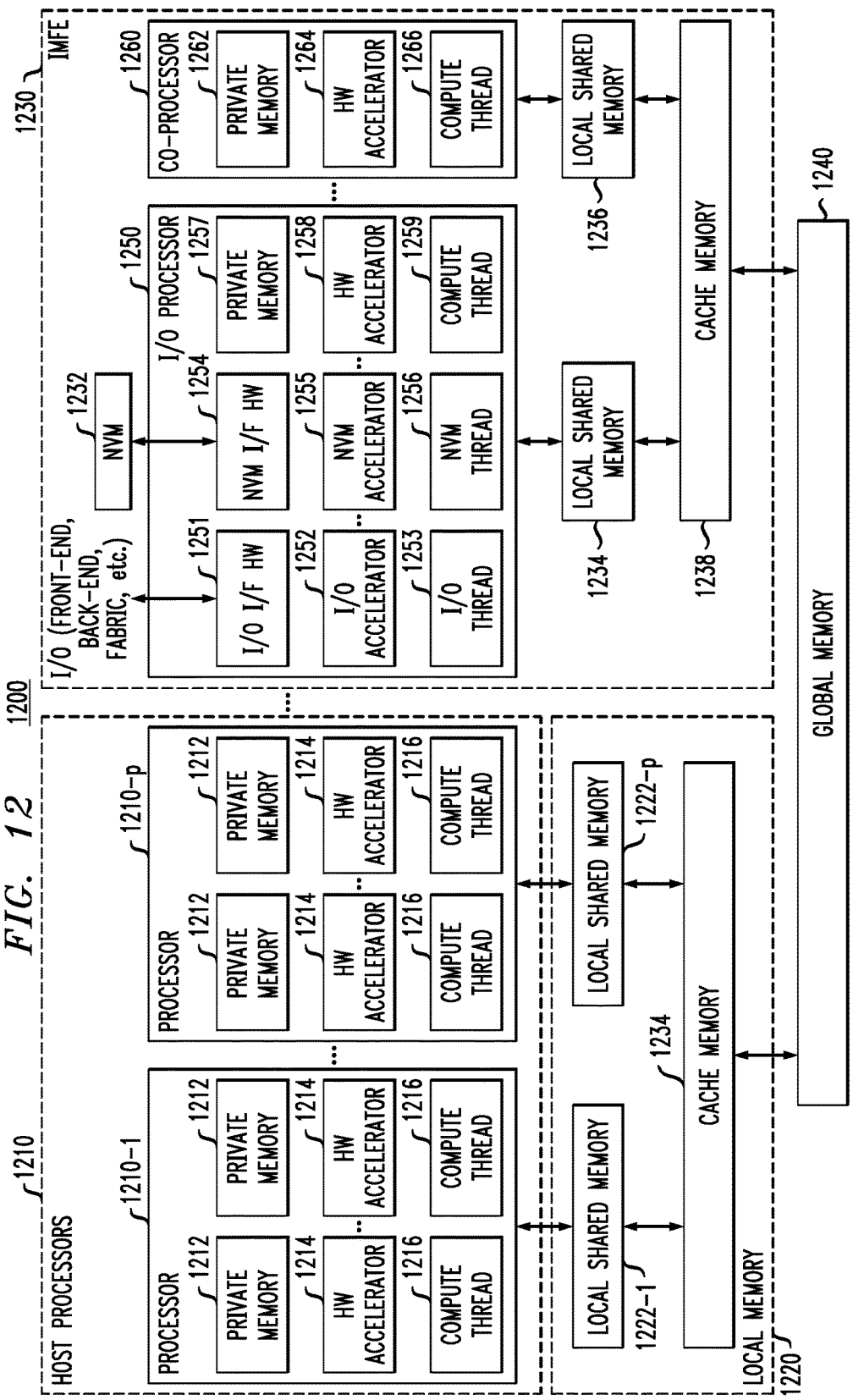
FIG. 12 schematically illustrates logical hardware elements of a server system in which a software framework is implemented to provide full I/O processing isolation as well as co-processing isolation from a server processor, according to another embodiment of the invention.
Figure 13:
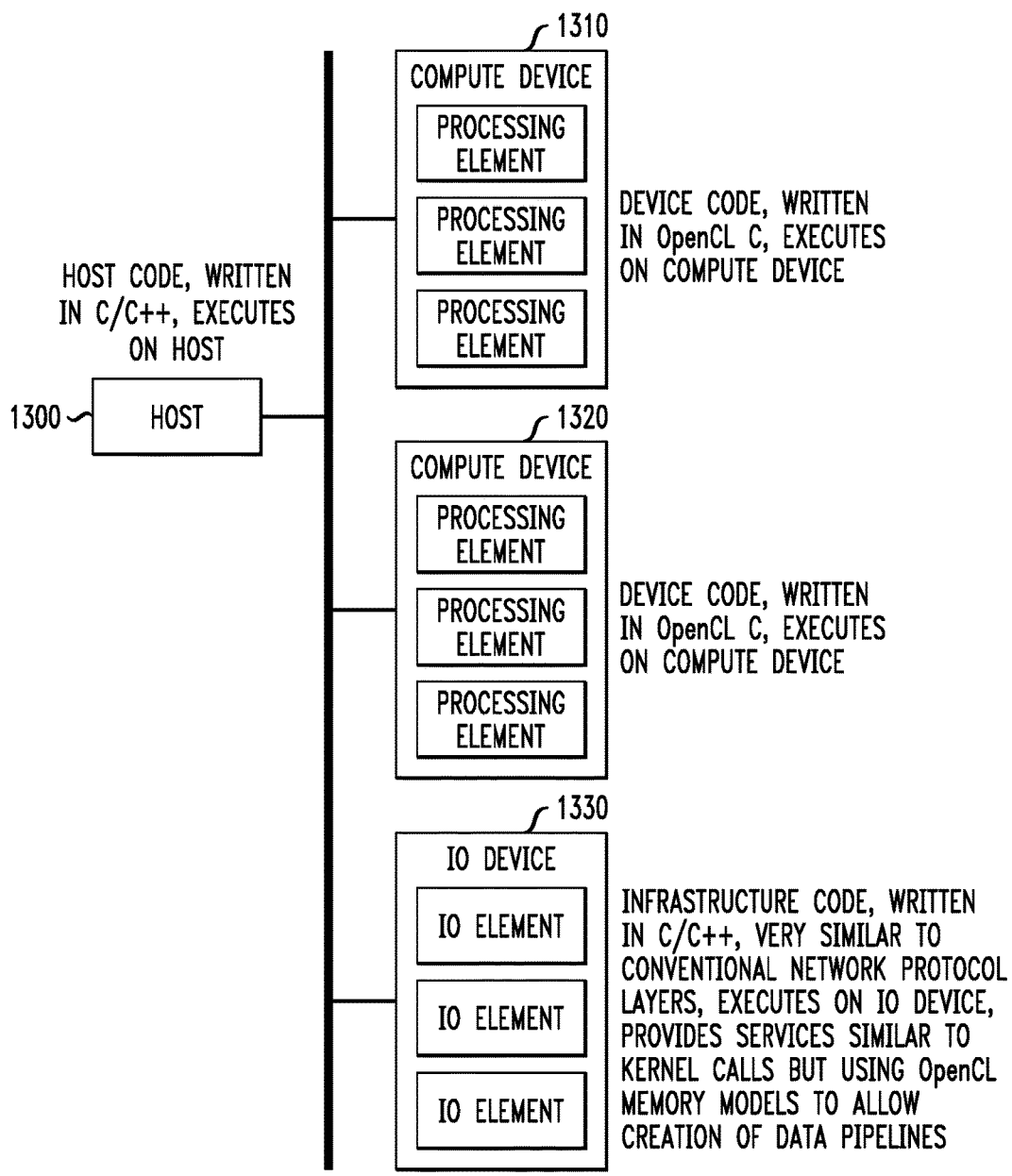
FIG. 13 schematically illustrates different types of program code that execute on different components of a server system to provide full I/O processing isolation as well as co-processing isolation from a server processor, according to another embodiment of the invention.

FIGS. 12, 13, and 14 schematically illustrates a software framework according to another embodiment of the invention, which allows full I/O processing isolation as well as co-processing isolation from a server processor (e.g., GPP). As explained in further detail below, the software framework allows a server processor to focus on latency sensitive control plane functionality, while I/O activity and processing is pipelined into parallel computation units to improve system throughput.

In one embodiment of the invention, the software framework is an extension of the existing Open Computing Language (OpenCL) framework. OpenCL is a framework for writing programs that execute across heterogeneous platforms consisting of GPPs, GPUs, DSPs, FPGAs, and other processors. OpenCL specifies a language (based on C99) for programming these devices and application programming interfaces (APIs) to control the platform and execute programs on the compute devices. OpenCL provides parallel computing using task-based and data-based parallelism.

Instead of having a compute centric model as with the existing OpenCL framework, with a GPP controlling compute elements, in one embodiment of the invention, this software framework is "data centric." In particular, a software framework according to an embodiment of the invention focuses primarily on data flow elements including IO termination devices and packet processing hardware, with the goal of making these disparate elements easily accessible to programmers, much like OpenCL does for computing with GPGPU and FPGA elements.

FIG. 12 schematically illustrates logical hardware elements of a server in which a software framework is implemented to provide full I/O processing isolation as well as co-processing isolation from a server processor, according to another embodiment of the invention. More specifically, FIG. 12 illustrates logical hardware elements of a server system 1200 comprising host processors 1210, an IFME 1230, and a global memory 1240, which is used to enable communication between the host processors 1210 and the IMFE 1230. The host processors 1210 comprise a plurality of control processors 1210-1, . . . , 1210-p. Each of the control processors 1210-1, . . . , 1210-p comprises one or more of a private memory 1212, a hardware accelerator core 1214, and a compute thread 1216 instantiated by an associated hardware accelerator core 1214. The host processors 1210 utilize the local memory 1220 which comprises a plurality of local shared memories 1222-1, . . . , 1222-p, and a cache memory 1224. The components of the control processor 1210-1 share the local shared memory 1222-1, and the components of the control processor 1210-p share the local shared memory 1222-p. The control processors 1210-1, . . . , 1210-p communicate and exchange data through the cache memory 1224.

The IMFE 1230 comprises a plurality of memory elements 1232, 1234, 1236, and 1238, an I/O processor 1250, and at least one co-processor 1260. The I/O processor 1250 comprises a plurality of components for processing I/O data including, I/O interface hardware 1251, an I/O hardware accelerator core 1252, and an I/O compute thread 1253 which is instantiated by the I/O hardware accelerator core 1252. In addition, the I/O processor 1250 comprises a plurality of components for controlling and managing the non-volatile memory 1232, wherein such components include memory interface hardware 1254, a NVM accelerator core 1255, and a NVM thread 1256 which is instantiated by the NVM accelerator core 1255. Moreover, the I/O processor 1250 comprises private memory 1257, hardware accelerator core 1258, and compute thread 1259 for processing other workloads that are offloaded from a host processor 1210.

The co-processor 1260 comprises a private memory 1262, a hardware accelerator core 1264, and a compute thread 1266 instantiated by the associated hardware accelerator core 1264. The co-processor 1260 is utilized by the I/O processor 1250 to assist in processing other workloads that are offloaded from a host processor using parallel processing control techniques.

The local shared memory 1234 is shared by the various components of the I/O processor 1250. The local shared memory 1236 is shared by the components of the co-processor 1260. The cache memory 1238 is coupled to the local shared memories 1234 and 1236 to enable communication between the I/O processor 1250 and the co-processor 1260.

FIG. 12 provides an overview of logical hardware elements that can be controlled by a software framework according to an embodiment of the invention to allow full I/O processing isolation as well as co-processing isolation from the server host processors 1210. In general, the software framework comprises libraries and run time elements that will coordinate, connect and transfer data between processing elements, thereby providing the foundational elements of a data flow oriented architecture. FIG. 13 schematically illustrates different types of program code that execute on different components of the server system 1200 of FIG. 12 to implement full I/O processing isolation as well as co-processing isolation from the server host processors 1210.

FIG. 13 shows a host 1300 connected to a plurality of compute devices 1310 and 1320, and an I/O device 1330. The compute devices 1310 and 1320 each comprise a plurality of processing elements, and the I/O device 1330 comprises a plurality of I/O elements. In one embodiment of the invention, the host 1300 executes host code that is written in any standard computer language such as C or C++. The host codes executes on the host 1300 to provide a runtime environment as well as library calls to effect coordination, data movement and other basic functions. Moreover, in one embodiment of the invention, the compute devices 1310 and 1320 execute device code that is written in OpenCL C. The device code is hardware independent and executes on a myriad of compute device architectures using build tools provided by the silicon vendor.

Furthermore, in one embodiment of the invention, the I/O device 1330 executes infrastructure code. The infrastructure code is written in C/C++ and comprises network protocol or storage protocol layers that execute at the system edge, offloading such processing from the host processor 1300. In one embodiment, the infrastructure code is configured to provide services that are similar to kernel calls while using OpenCL memory models to allow the creation of data pipelines. In this framework, a data flow from an IO interface (source) or a data flow to an IO interface (sink) can be connected to particular compute devices 1310, 1320 under the control of the host 1300. These compute devices can be general purpose in nature (e.g. big cores or throughput cores) or more specialized (e.g. DSP cores, GPU cores, FPGA elements, etc.).

FIG. 14 illustrates an example data processing flow that is implemented by the server system of FIG. 12 to provide full I/O processing isolation as well as co-processing isolation from a server processor, according to another embodiment of the invention. In particular, FIG. 14 illustrates a data flow that is implemented by a control processor (e.g., processor 1210-1), the I/O processor 1250, and the co-processor 1260 shown in FIG. 12. An I/O data packet is received by the I/O processor (block 1400). For example, in the embodiment of FIG. 12, the I/O processor 1250 receives an I/O data packet via the I/O interface hardware 1251. The I/O data packet is parsed to extract information from the packet (block 1402). For example, in the embodiment of FIG. 12, the I/O accelerator 1252 instantiates an I/O thread 1253 to perform a data packet parsing process.

Next, the payload of the data packet is processed using an SHA (secure hash algorithm) process to decode the data (block 1404). In one embodiment of the invention, the SHA process is performed by the hardware accelerator 1258 instantiating a compute thread 1259 to execute the SHA calculations on the data packet. The IO processor 1250 then pushes the processed packet into the global memory 1240 and notifies the host control processor 1210-1 (block 1408). The host control processor 1210-1 receives notification that the initial packet processing is complete and that the results are available in the global memory 1240 (block 1410).

The host processor then initiates a next step in the data flow which comprises initiating a data parallel operation by a co-processor (block 1412). For example, in the embodiment of FIG. 12, the control processor 1210-1 can instruct the co-processor 1260 to commence a data compression process. The host processor pushes device code (e.g. a kernel) to the co-processor (block 1414), and then points the kernel to the data residing in the global memory (block 1416).

The co-processor 1260 pulls the data into the private memory 1262, and the kernel is executed by the co-processor 1260 to process the data (block 1418). For example, in the embodiment of FIG. 12, the hardware accelerator 1264 instantiates a compute thread 1266 to execute the kernel and process the data. The processing results are then pushed back to the global memory 1240 (block 1420), and the co-processor 1260 sends a notification to the host processor 1210-1 that the processing is complete. The host processor 1210-1 receives the notification, which completes the data processing flow for the given packet (block 1422). The process is repeated for each received packet, and the packet processing can be performed in parallel for different packets.

For example, in the embodiment of FIG. 12, each processing element can have work pipelined through it operating in parallel. For example, the IO processor 1250 will be handling the $N^{th}+1$ packet while the co-processor 1260 is handling the $N^{th}$ packet. Similarly, a host processor 1210 is allowed to execute and only rendezvous with the other elements when necessary. The runtimes of the framework can take advantage of any available hardware elements (e.g. caching elements) to reduce the amount of data transfer between devices. For example, the process of blocks 1408 and 1418 in FIG. 14 can be a "Zero-copy" operation (if hardware support is present), wherein the host processor does not perform the task of copying data from one memory to another memory.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computing system, comprising:
    a server node comprising a first processor, a second processor, a shared memory system, and an application hosted by the server node and executed by the first and second processors, wherein the application comprises a first component and a second component; and
    a data storage system connected to the server node;
    wherein the first processor executes the first component of the application related to data computing functions of the application;
    wherein the second processor executes the second component of the application related to input/output (I/O) functions of the application and data storage functions for storing application data in the data storage system, wherein the I/O functions comprise network I/O functions for interfacing with one or more communications networks, wherein the second processor is configured to perform converged network functions to implement the network I/O functions that are instructed by the second component of the application executed by the second processor, by providing a data entry point and data exit point to and from a front-end communications network and a backend data storage network;
    wherein the I/O functions and the data storage functions of the second component of the application executed by the second processor are performed in parallel with the data computing functions of the first component of the application executed by the first processor;
    wherein the shared memory system is configured to enable an exchange of messages and data between the first and second processors to coordinate execution of the data computing functions, the I/O functions, and the data storage functions;
    wherein the first processor executes a first operating system which is utilized by the first component of the application executed by the first processor to perform the data computing functions of the application; and
    wherein the second processor executes a second operating system which is utilized by the second component of the application executed by the second processor to perform the I/O functions and the data storage functions of the application.

2. The computing system of claim 1, wherein the I/O functions comprise one or more of I/O data stream initiation and termination, data hashing, data cryptography, data compression deduplication, data integrity checking, and local data processing.

3. The computing system of claim 1, wherein the data storage functions comprise one or more of data placement, data replication, erasure coding, server caching, memory indexing, memory lookup functions, and virtual switching from hypervisors running on the first processor.

4. The computing system of claim 1, wherein the first processor comprises one or more general purpose processors, and wherein the second processor comprises a system-on-chip comprising one or more workload-optimized processor cores configured to process the I/O functions and the data storage functions.

5. The computing system of claim 4, wherein the system-on-chip comprises integrated I/O ports to implement the network I/O functions and provide the data entry point and the data exit point to and from the front-end communications network and the backend data storage network.

6. The computing system of claim 1, wherein the first and second components of the application communicate through messages exchanged using the shared memory system.

7. The computing system of claim 1, wherein the shared memory system comprises a shared memory device and a multiport memory management unit that is utilized by the first and second processors to manage the shared memory device.

8. A method, comprising:
   hosting an application on a server node, wherein the server node comprises a first processor, a second processor, and a shared memory system, wherein the application comprises a first component and a second component;
   executing the first component of the application on the first processor of the server node, wherein the first component is related to data computing functions of the application;
   executing the second component of the application on the second processor of the server node, wherein the second component is related to input/output (I/O) functions of the application and data storage functions for storing application data in a data storage system connected to the server node, wherein the I/O functions comprise network I/O functions for interfacing with one or more communications networks, wherein the second processor is configured to perform converged network functions to implement the network I/O functions that are instructed by the second component of the application executed by the second processor, by providing a data entry point and data exit point to and from a front-end communications network and a backend data storage network;
   wherein the I/O functions and the data storage functions of the second component of the application are executed by the second processor in parallel with the data computing functions of the first component of the application executed by the first processor; and
   exchanging messages and data between the first and second processors using the shared memory system to coordinate execution of the data computing functions, the I/O functions, and the data storage functions;
   wherein the first processor executes a first operating system which is utilized by the first component of the application executed by the first processor to perform the data computing functions of the application; and
   wherein the second processor executes a second operating system which is utilized by the second component of the application executed by the second processor to perform the I/O functions and the data storage functions of the application.

9. The method of claim 8, wherein the I/O functions comprise one or more of I/O data stream initiation and termination, data hashing, data cryptography, data compression deduplication, data integrity checking, and local data processing.

10. The method of claim 8, wherein the data storage functions comprise one or more of data placement, data replication, erasure coding, server caching, memory indexing and memory lookup functions.

11. The method of claim 8, further comprising exchanging messages between the first and second components of the application using the shared memory system.

12. The method of claim 8, wherein the first processor comprises a general purpose processor, and wherein the second processor comprises a workload-optimized processor.

13. The method of claim 12, wherein the workload-optimized processor comprises integrated I/O ports to implement the network I/O functions and provide the data entry point and the data exit point to and from the front-end communications network and the backend data storage network.

14. An article of manufacture comprising a non-transitory processor-readable storage medium having stored therein software instructions, which are executable by one or more hardware processor devices to:
   host an application on a server node, wherein the server node comprises a first processor, a second processor, and a shared memory system, wherein the application comprises a first component and a second component;
   execute the first component of the application on the first processor of the server node, wherein the first component is related to data computing functions of the application;
   execute the second component of the application on the second processor of the server node, wherein the second component is related to input/output (I/O) functions of the application and data storage functions for storing application data in a data storage system connected to the server node, wherein the I/O functions comprise network I/O functions for interfacing with one or more communications networks, wherein the second processor is configured to perform converged network functions to implement the network I/O functions that are instructed by the second component of the application executed by the second processor, by providing a data entry point and data exit point to and from a front-end communications network and a backend data storage network;
   wherein the I/O functions and the data storage functions of the second component of the application are executed by the second processor in parallel with the data computing functions of the first component of the application executed by the first processor; and
   exchange messages and data between the first and second processors using the shared memory system to coordinate execution of the data computing functions, the I/O functions, and the data storage functions;
   wherein the first processor executes a first operating system which is utilized by the first component of the application executed by the first processor to perform the data computing functions of the application; and wherein the second processor executes a second operating system which is utilized by the second component of the application executed by the second processor to perform the I/O functions and the data storage functions of the application.

15. The article of manufacture of claim 14, wherein the I/O functions comprise one or more of I/O data stream initiation and termination, data hashing, data cryptography, data compression deduplication, data integrity checking, and local data processing.

16. The article of manufacture of claim 14, wherein the data storage functions comprise one or more of data placement, data replication, erasure coding, server caching, memory indexing and memory lookup functions.

17. The article of manufacture of claim 14, wherein the software instructions are further executable by the one or more hardware processor devices to exchange messages between the first and second components of the application using the shared memory system.

* * * * *